(12) United States Patent
Frige Filho et al.

(10) Patent No.: US 10,890,022 B2
(45) Date of Patent: Jan. 12, 2021

(54) ICE-BREAKING HINGE ASSEMBLIES FOR VEHICLE CLOSURE MEMBERS

(71) Applicant: FORD GLOBAL TECHNOLOGIES, LLC, Dearborn, MI (US)

(72) Inventors: Carlos Alberto Frige Filho, Camacari (BR); Marcelo Bertoldi, Lauro de Freitas (BR)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 155 days.

(21) Appl. No.: 16/156,162

(22) Filed: Oct. 10, 2018

(65) Prior Publication Data

US 2020/0115940 A1   Apr. 16, 2020

(51) Int. Cl.
| | | |
|---|---|---|
| *E05D 11/00* | (2006.01) | |
| *E05D 5/02* | (2006.01) | |
| *B60J 5/10* | (2006.01) | |
| *E05D 3/02* | (2006.01) | |

(52) U.S. Cl.
CPC ............. *E05D 11/00* (2013.01); *B60J 5/105* (2013.01); *E05D 3/02* (2013.01); *E05Y 2900/546* (2013.01)

(58) Field of Classification Search
CPC ..... Y10T 16/522; Y10T 16/558; E05D 11/00; E05D 11/0027; E05D 11/0054; E05D 2011/0036; E05D 2011/0045; E05D 2011/0072; E05D 3/02; B60J 5/105; E05Y 2900/546; E05Y 2900/50; E05Y 2900/531; E05Y 2900/532

USPC .......... 296/146.11, 146.12; 49/397, 398, 399
See application file for complete search history.

(56) References Cited

U.S. PATENT DOCUMENTS

| | | | | |
|---|---|---|---|---|
| 2,151,240 | A * | 3/1939 | Soss ........................ | E05D 3/02 16/251 |
| 2,166,815 | A * | 7/1939 | Jones ...................... | E05D 3/02 16/223 |
| 2,665,921 | A | 1/1954 | Schetzer | |
| 3,854,167 | A * | 12/1974 | Fukumoto ........... | E05D 11/1085 16/277 |
| 4,766,643 | A * | 8/1988 | Salazar .................. | E05D 7/105 16/222 |
| 4,881,298 | A * | 11/1989 | Turnbull ................ | E05D 5/062 16/266 |
| 5,305,969 | A | 4/1994 | Odell et al. | |
| 5,337,977 | A | 8/1994 | Fleming et al. | |
| 5,685,046 | A * | 11/1997 | Neag ...................... | E05D 3/127 16/366 |
| 7,596,831 | B2 * | 10/2009 | Faubert .................. | E05D 3/18 16/287 |
| 7,748,768 | B2 * | 7/2010 | Hofacker ............... | E05D 5/121 16/374 |

(Continued)

FOREIGN PATENT DOCUMENTS

| | | | |
|---|---|---|---|
| CN | 104803264 A | 7/2015 | |
| GB | 1437502 A * | 5/1976 | ......... E05D 11/1085 |

*Primary Examiner* — Chuck Y Mah
(74) *Attorney, Agent, or Firm* — David Coppiellie; Carlson, Gaskey & Olds (57) ABSTRACT

This disclosure is directed to hinge assemblies for securing closure members to a vehicle body. Exemplary hinge assemblies may include icebreaker features for breaking through ice formations that can form on the closure members. The icebreaker features are configured to break through the ice formations as the closure members are moved.

18 Claims, 5 Drawing Sheets

(56) References Cited

U.S. PATENT DOCUMENTS

| | | | |
|---|---|---|---|
| 7,946,017 B2 * | 5/2011 | Brown | E05D 11/1042 |
| | | | 29/426.6 |
| 8,127,401 B2 * | 3/2012 | Folk | E05D 11/1014 |
| | | | 16/374 |
| 9,512,662 B1 | 12/2016 | Dudar et al. | |
| 10,011,363 B2 | 7/2018 | Perrier et al. | |
| 10,385,602 B2 * | 8/2019 | Smith | E05F 3/20 |
| 2003/0140455 A1 * | 7/2003 | Audisio | E05D 11/1085 |
| | | | 16/334 |
| 2008/0092332 A1 * | 4/2008 | Lowen | E05D 5/062 |
| | | | 16/221 |
| 2018/0051502 A1 | 2/2018 | Roos et al. | |

* cited by examiner

ICE-BREAKING HINGE ASSEMBLIES FOR VEHICLE CLOSURE MEMBERS

TECHNICAL FIELD

This disclosure relates to hinge assemblies for vehicle closure members, and more particularly to hinge assemblies that include features for breaking ice formations that can form on the vehicle closure members.

BACKGROUND

During certain inclement weather conditions, ice can form on exterior surfaces of vehicle closure members (e.g., doors, liftgates, swing gates, etc.). If not removed, the ice formations could damage the closure member as a driver or passenger attempts to open the closure member.

SUMMARY

A vehicle closure member hinge assembly according to an exemplary aspect of the present disclosure includes, among other things, a vehicle body mounting plate, a closure member mounting plate pivotally connected to the vehicle body mounting plate, and an icebreaker flange configured to break an ice formation as the closure member mounting plate is pivoted relative to the vehicle body mounting plate.

In a further non-limiting embodiment of the foregoing vehicle closure member hinge assembly, the closure member mounting plate is pivotally connected to the vehicle body mounting plate by a hinge pin.

In a further non-limiting embodiment of either of the foregoing vehicle closure member hinge assemblies, the icebreaker flange extends from the closure member mounting plate.

In a further non-limiting embodiment of any of the foregoing vehicle closure member hinge assemblies, the icebreaker flange and the closure member mounting plate together establish a single piece, monolithic part.

In a further non-limiting embodiment of any of the foregoing vehicle closure member hinge assemblies, the icebreaker flange is a separate component from the vehicle body mounting plate and the closure member mounting plate.

In a further non-limiting embodiment of any of the foregoing vehicle closure member hinge assemblies, the icebreaker flange includes a platform portion and blade portion.

In a further non-limiting embodiment of any of the foregoing vehicle closure member hinge assemblies, the blade portion includes a cutting edge that is configured to break through the ice formation.

In a further non-limiting embodiment of any of the foregoing vehicle closure member hinge assemblies, the blade portion extends transversely from the platform portion.

In a further non-limiting embodiment of any of the foregoing vehicle closure member hinge assemblies, the platform portion extends from or is received against a mounting foot of the closure member mounting plate, and the blade portion extends to a location beneath the closure member mounting plate and the vehicle body mounting plate.

In a further non-limiting embodiment of any of the foregoing vehicle closure member hinge assemblies, the icebreaker flange includes a first flange piece and a second flange piece in abutting engagement with the first flange piece.

In a further non-limiting embodiment of any of the foregoing vehicle closure member hinge assemblies, the icebreaker flange includes a platform portion, a first blade portion, and a second blade portion.

In a further non-limiting embodiment of any of the foregoing vehicle closure member hinge assemblies, the icebreaker flange includes a blade portion having a curved cutting edge.

A vehicle according to another exemplary aspect of the present disclosure includes, among other things, a vehicle body, a closure member, and a hinge assembly for mounting the closure member to the vehicle body. The hinge assembly includes a first mounting plate mounted to the vehicle body, a second mounting plate mounted to the closure member, and an icebreaker flange configured to break through an ice formation formed at an interface between the closure member and the vehicle body.

In a further non-limiting embodiment of the foregoing vehicle, the closure member is a swing gate.

In a further non-limiting embodiment of either of the foregoing vehicles, the icebreaker flange extends from the second mounting plate and includes a platform portion and blade portion.

In a further non-limiting embodiment of any of the foregoing vehicles, the icebreaker flange is a separate component from the first mounting plate and the second mounting plate.

In a further non-limiting embodiment of any of the foregoing vehicles, the icebreaker flange and the second mounting plate together establish a single piece, monolithic part.

In a further non-limiting embodiment of any of the foregoing vehicles, the icebreaker flange includes a first flange piece and a second flange piece received in abutting engagement with the first flange piece.

In a further non-limiting embodiment of any of the foregoing vehicles, the icebreaker flange includes a platform portion, a first blade portion, and a second blade portion.

In a further non-limiting embodiment of any of the foregoing vehicles, the icebreaker flange includes a blade portion having a curved cutting edge.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details hinge assemblies for securing closure members to a vehicle body. Exemplary hinge assemblies may include icebreaker features for breaking ice formations that can form on the closure members. The icebreaker features are configured to break through the ice formations as the closure members are moved. These and other features of this disclosure are described in greater detail below.

Figure 1:
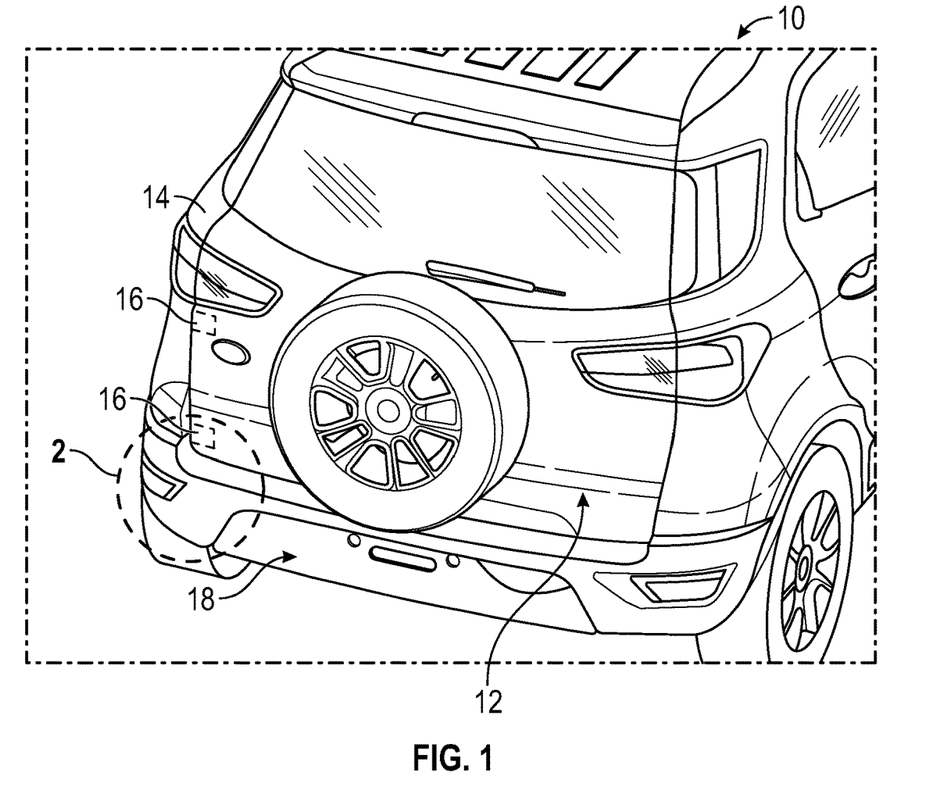
FIG. 1 illustrates a vehicle equipped with a closure member.

FIG. 1 schematically illustrates select portions of a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a closure member 12 movably mounted to a vehicle body 14. For example, the closure member 12 could be pivotally mounted to the vehicle body 14 using a multitude of hinge assemblies 16 for allowing passengers to access the vehicle 10. In an embodiment, upper and lower hinge assemblies 16 that are vertically spaced apart are provided to movably mount the closure member 12 to the vehicle body 14. However, a greater or fewer number of hinge assemblies could be utilized within the scope of this disclosure for mounting the closure member 12 to the vehicle body 14.

In an embodiment, the closure member 12 is a swing gate located at a rear 18 of the vehicle 10. However, other vehicle closure members, including but not limited to side doors, liftgates, hoods, decklids, etc., could also benefit from the teachings of this disclosure. In addition, although only a single closure member is emphasized in FIG. 1, the vehicle 10 could include multiple closure members having hinge assembly designs similar to those described by this disclosure.

Figure 2:
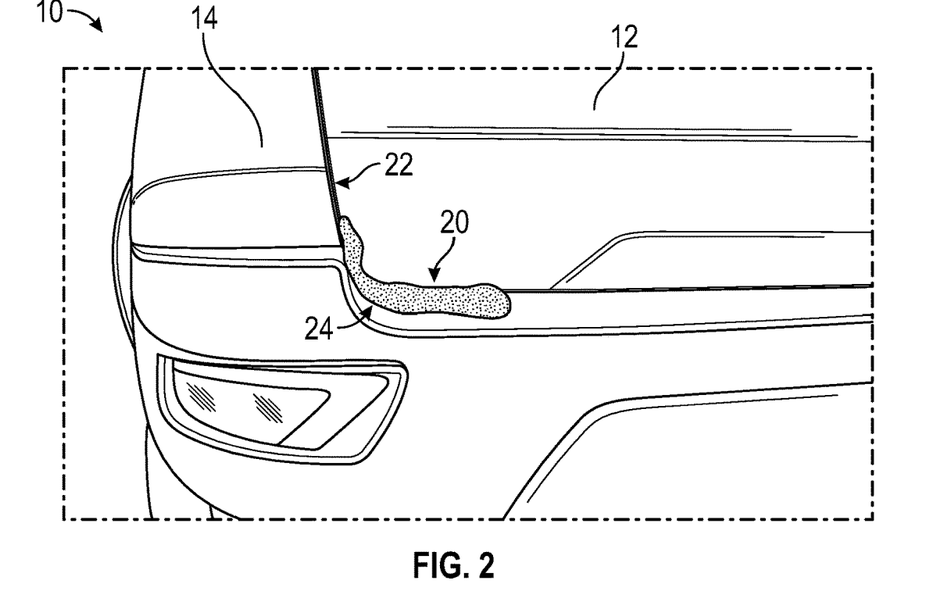
FIG. 2 schematically illustrates an ice formation formed on the closure member of the vehicle of FIG. 1.

Referring now to FIG. 2, an ice formation 20 may form on the closure member 12, such as during inclement weather. In an embodiment, the ice formation 20 may form on an interface 22 between the closure member 12 and the vehicle body 14. The interface 22 may be at the location where the closure member 12 pivots relative to the vehicle body 14. In another embodiment, the ice formation 20 may form near a lower corner 24 of the closure member 12 on the hinge assembly-side of the closure member 12.

If not removed, the ice formation 20 could damage the closure member 12 when a driver or passenger attempts to move the closure member 12 toward an open position. This disclosure therefore proposes icebreaker features that are incorporated as part of the hinge assemblies 16 for breaking the ice formations 20, thereby substantially reducing any likelihood that the closure member 12 can be damaged during the opening process.

Figure 3:
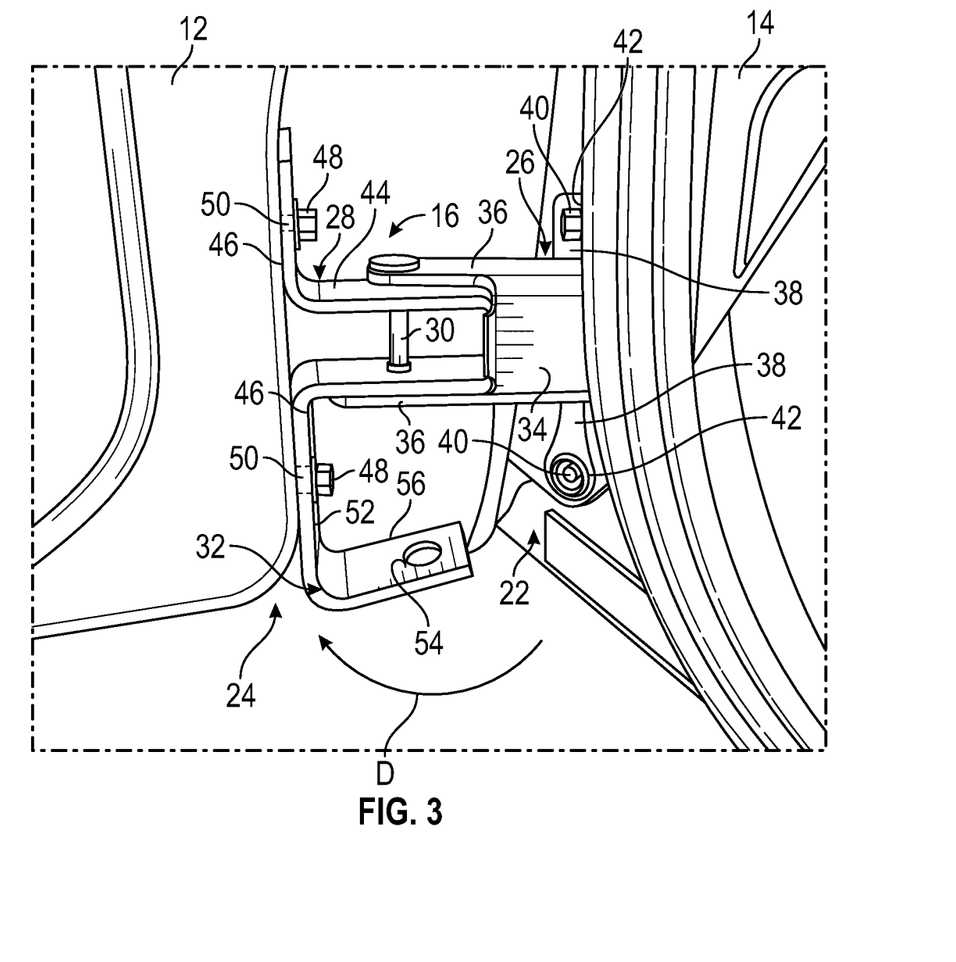
FIG. 3 illustrates a hinge assembly for mounting a closure member to a vehicle body.

FIG. 3, with continued reference to FIGS. 1 and 2, illustrates an exemplary hinge assembly 16 for mounting the closure member 12 to the vehicle body 14. The hinge assembly 16 of FIG. 3 is depicted as being a lower hinge assembly in that it is attached near the lower corner 24 of the closure member 12. However, the hinge assembly 16 could be located at any other locations relative to the closure member 12. The specific mounting location of the hinge assembly 16 could depend on a variety of factors including where the ice formations are most likely to form.

The hinge assembly 16 may include a vehicle body mounting plate 26 (e.g., a first mounting plate), a closure member mounting plate 28 (e.g., a second mounting plate), a hinge pin 30, and an icebreaker flange 32. The vehicle body mounting plate 26 may be mounted to the vehicle body 14, whereas the closure member mounting plate 28 may be mounted to the closure member 12. The closure member mounting plate 28 may be pivotally mounted to the vehicle body mounting plate 26 by the hinge pin 30.

The vehicle body mounting plate 26 may include a base portion 34 and a pair of arms 36 that extend from the base portion 34. The base portion 34 may include mounting feet 38 for mounting the vehicle body mounting plate 26 to the vehicle body 14. One or more fasteners 40 (e.g., bolts or screws) may be inserted through openings 42 of the mounting feet 38 for securing the vehicle body mounting plate 26 to the vehicle body 14.

The closure member mounting plate 28 may include a U-shaped body 44 and one or more mounting feet 46 connected to the U-shaped body 44. One or more fasteners 48 (e.g., bolts or screws) may be inserted through openings 50 of the mounting feet 46 for securing the closure member mounting plate 28 to the closure member 12.

In an assembled position, the U-shaped body 44 of the closure member mounting plate 28 may be received between the pair of arms 36 of the vehicle body mounting plate 26. The hinge pin 30 may extend through the pair of arms 36 and through the U-shaped body 44 for pivotally connecting the closure member mounting plate 28 to the vehicle body mounting plate 26.

The vehicle body mounting plate 26 and the closure member mounting plate 28 may be stamped, metallic parts. However, other manufacturing techniques and materials could alternatively be utilized to construct the mounting plates 26, 28.

Figure 4:
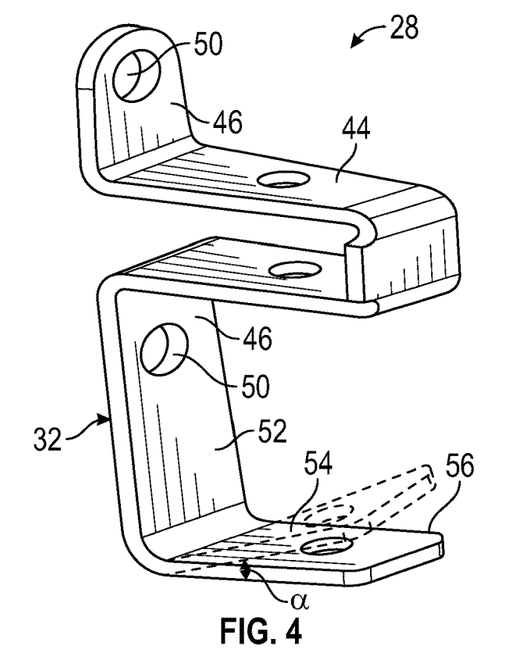
FIG. 4 illustrates a combined mounting plate and icebreaker flange of the hinge assembly of FIG. 3.

Referring now to FIGS. 3-4, the hinge assembly 16 may additionally include the icebreaker flange 32. In an embodiment, the icebreaker flange 32 is part of or connected to the closure member mounting plate 28. However, an opposite configuration is also contemplated within the scope of this disclosure in which the icebreaker flange 32 is part of or connected to the vehicle body mounting plate 26.

In an embodiment, the icebreaker flange 32 is integral with the closure member mounting plate 28 to establish a single-piece, monolithic part. However, in other embodiments, the icebreaker flange 32 could be a separate component from the closure member mounting plate 28 (see, e.g., FIGS. 5 and 7). Similar to the mounting plates 26, 28, the icebreaker flange 32 may be a metallic part.

The icebreaker flange 32 may include a platform portion 52 and a blade portion 54. The platform portion 52 positions the blade portion 54 at a location that is beneath the vehicle body mounting plate 26 and the closure member mounting plate 28. The platform portion 52 may abut against the closure member 12 when the closure member mounting plate 28 is mounted thereto. The blade portion 54 may extend transversely from an end of the platform portion 52. In an embodiment, the blade portion 54 is about perpendicular to the platform portion 52. In another embodiment, the blade portion 54 may be positioned at a slight angle α relative to the platform portion 52 (see phantom lines in FIG. 4) for improving the ice breaking ability of the blade portion 54.

The blade portion 54 of the icebreaker flange 32 may include a cutting edge 56 that is configured to cut through any ice formations that may be formed at the interface 22 between the closure member 12 and the vehicle body 14. The cutting edge 56 may include sharp sections, blunt sections, or both.

In use, the cutting edge 56 of the blade portion 54 of the icebreaker flange 32 is designed to break through ice formations as the closure member 12 is moved in a direction D toward an open position. The ice formation is therefore unlikely to damage the closure member 12 during the process of opening the closure member 12.

Figure 5:
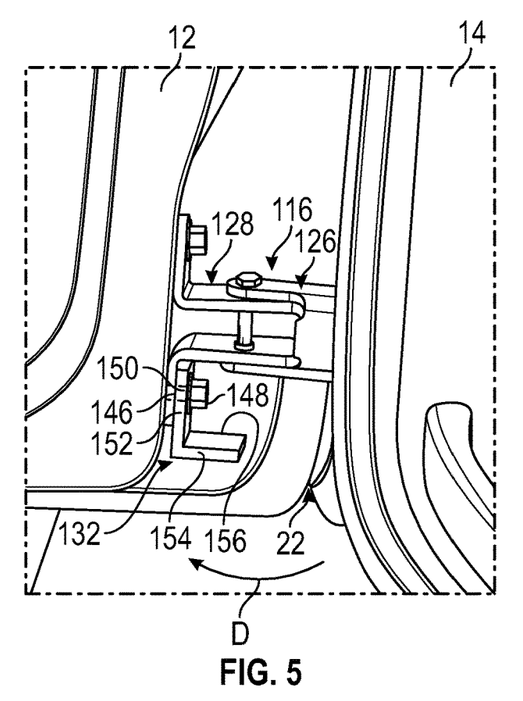
FIG. 5 illustrates another exemplary hinge assembly for mounting a closure member to a vehicle body.

FIG. 5 illustrates another exemplary hinge assembly 116 for mounting a closure member 12 to a vehicle body 14. The hinge assembly 116 is similar to the hinge assembly 16 of FIG. 3. However, in this embodiment, the hinge assembly 116 includes an icebreaker flange 132 that is a separate component from both a vehicle body mounting plate 126 and a closure member mounting plate 128 of the hinge assembly 116.

Figure 6:
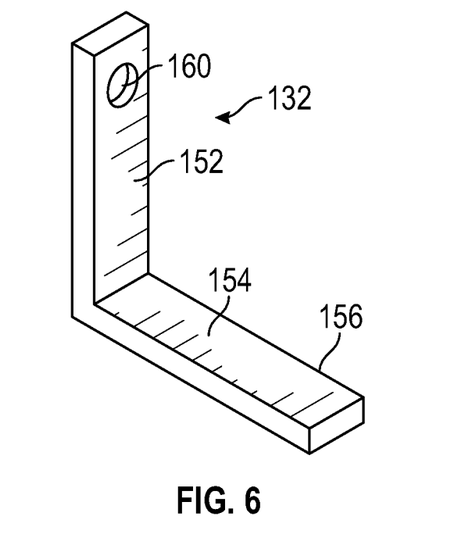
FIG. 6 illustrates an icebreaker flange of the hinge assembly of FIG. 5.

Referring now to FIGS. 5 and 6, the icebreaker flange 132 may include a platform portion 152 and a blade portion 154. The platform portion 52 may abut against a mounting foot 146 of the closure member mounting plate 128 and may be secured against the mounting foot 146 by a fastener 148. The fastener 148 may be received through an opening 160 formed in the platform portion 152 of the icebreaker flange 132. The fastener 148 may additionally extend through an opening 150 formed in the mounting foot 146 in order to secure the closure member mounting plate 128 to the closure member 12.

The blade portion 154 may extend transversely from the platform portion 152. The blade portion 154 of the icebreaker flange 132 may include a cutting edge 156 that is configured to cut through any ice formations that may be formed at an interface 22 between the closure member 12 and the vehicle body 14. In use, the cutting edge 156 of the blade portion 154 of the icebreaker flange 132 is designed to break through ice formations as the closure member 12 is swung or otherwise moved in a direction D. The ice formation is therefore unlikely to damage the closure member 12 during the process of opening the closure member 12.

Figure 7:
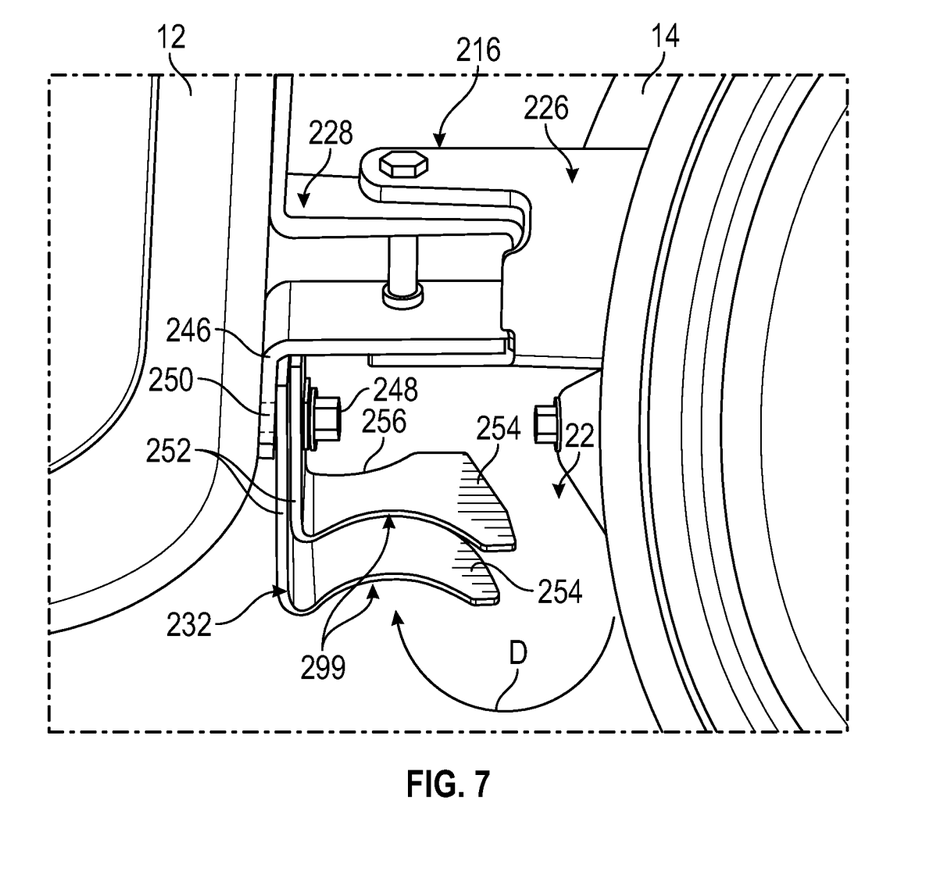
FIG. 7 illustrates another exemplary hinge assembly for mounting a closure member to a vehicle body.

FIG. 7 illustrates yet another exemplary hinge assembly 216 for mounting a closure member 12 to a vehicle body 14. The hinge assembly 216 is similar to the hinge assembly 116 of FIG. 5. However, in this embodiment, the hinge assembly 216 includes an icebreaker flange 232 embodying a different design than those discussed above.

Figure 8:
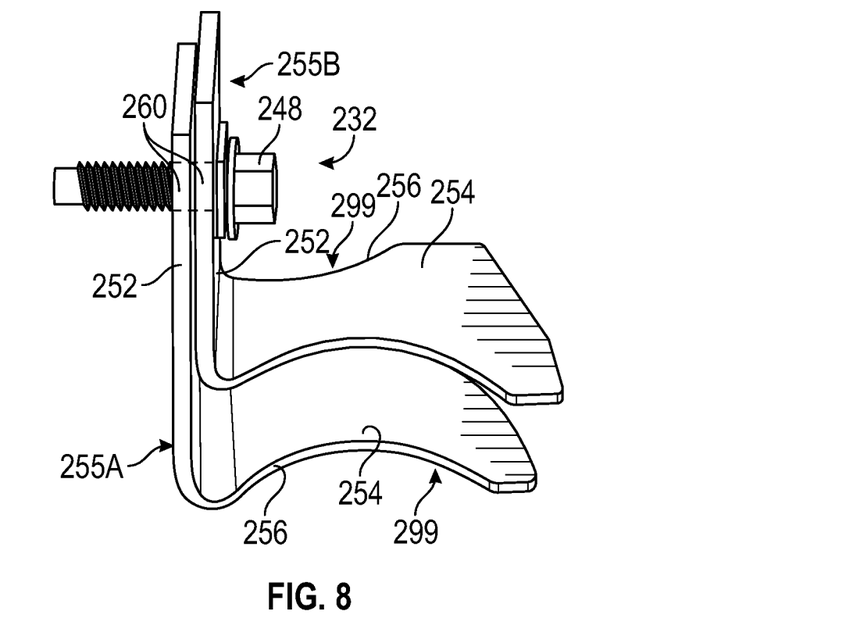
FIG. 8 illustrates a first exemplary icebreaker flange of the hinge assembly of FIG. 7.

Referring now to FIGS. 7 and 8, the icebreaker flange 232 is a separate component from both a vehicle body mounting plate 226 and a closure member mounting plate 228 of the hinge assembly 216. The icebreaker flange 232 may include a first flange piece 255A and a second flange piece 255B. The first and second flange pieces 255A, 255B may be received back-to-back and in abutting engagement to establish the icebreaker flange 232.

Each of the first flange piece 255A and the second flange piece 255B may include a platform portion 252 and a blade portion 254. The platform portions 252 may include openings 260 for securing the icebreaker flange 232 to a mounting foot 246 of the closure member mounting plate 228 of the hinge assembly 216. A fastener 248 may be received through the openings 260. The fastener 248 may additionally extend through an opening 250 formed in the mounting foot 246 in order to secure the closure member mounting plate 228 to the closure member 12.

The blade portions 254 may extend transversely from the platform portions 252. Each blade portion 254 may include a curved cutting edge 256 that is configured to cut through any ice formations that may be formed at an interface 22 between the closure member 12 and the vehicle body 14. In an embodiment, the curved cutting edges 256 are established by scalloped cut-outs 299 formed in the blade portions 254.

In use, the curved cutting edges 256 of the blade portions 254 of the icebreaker flange 232 are designed to more easily break through ice formations as the closure member 12 is moved in a direction D toward an open position. The ice formation is therefore unlikely to damage the closure member 12 during the process of opening the closure member 12.

Figure 9:
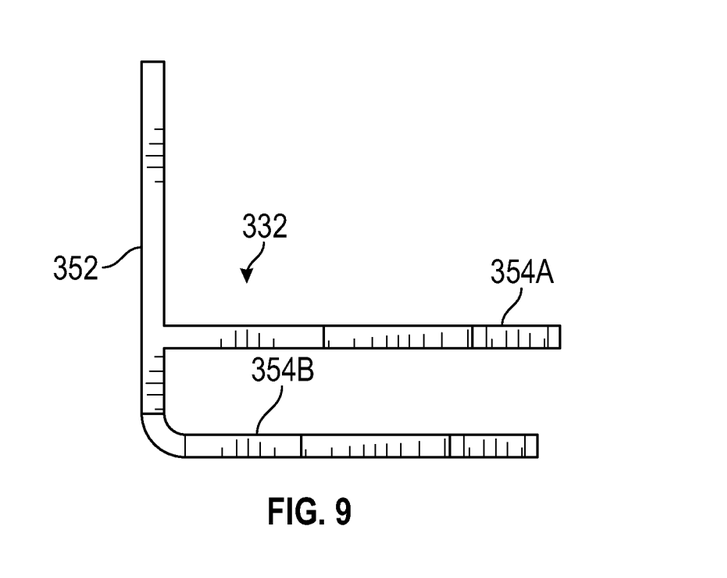
FIG. 9 illustrates a second exemplary icebreaker flange of the hinge assembly of FIG. 7.

FIG. 9 illustrates another icebreaker flange 332 that could be utilized with the hinge assembly 216 of FIG. 7, for example. In this embodiment, the icebreaker flange 332 embodies a single-piece design that includes a platform portion 352, a first blade portion 354A, and a second blade portion 354B. The first and second blade portions 354A, 354B are formed integrally with the platform portion 352. The first blade portion 354A may be positioned above the second blade portion 354B.

The vehicle closure member hinge assemblies described herein incorporate ice breaker features that are both easy to install and operate. The ice breaker features improve vehicle quality and customer satisfaction by preventing damage during opening events that may occur during a time in which ice formations are present on the exterior surfaces of the closure member.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A vehicle closure member hinge assembly, comprising:
   a vehicle body mounting plate;
   a closure member mounting plate pivotally connected to the vehicle body mounting plate; and an icebreaker flange configured to break an ice formation as the closure member mounting plate is pivoted relative to the vehicle body mounting plate, wherein the icebreaker flange and the closure member mounting plate together establish a single piece, monolithic part.

2. The vehicle closure member hinge assembly as recited in claim 1, wherein the closure member mounting plate is pivotally connected to the vehicle body mounting plate by a hinge pin.

3. The vehicle closure member hinge assembly as recited in claim 1, wherein the icebreaker flange extends from the closure member mounting plate.

4. The vehicle closure member hinge assembly as recited in claim 1, wherein the icebreaker flange is a separate component from the vehicle body mounting plate.

5. The vehicle closure member hinge assembly as recited in claim 1, wherein the icebreaker flange includes a platform portion and blade portion, and further wherein the blade portion includes a cutting edge that is configured to break through the ice formation.

6. The vehicle closure member hinge assembly as recited in claim 5, wherein the blade portion extends transversely from the platform portion.

7. The vehicle closure member hinge assembly as recited in claim 5, wherein the platform portion extends from or is received against a mounting foot of the closure member mounting plate, and the blade portion extends to a location beneath the closure member mounting plate and the vehicle body mounting plate.

8. The vehicle closure member hinge assembly as recited in claim 1, wherein the icebreaker flange includes a platform portion, a first blade portion, and a second, separate blade portion.

9. The vehicle closure member hinge assembly as recited in claim 1, wherein the icebreaker flange includes a blade portion having a curved cutting edge.

10. A vehicle closure member hinge assembly, comprising:
- a vehicle body mounting plate;
- a closure member mounting plate pivotally connected to the vehicle body mounting plate; and
- an icebreaker flange configured to break an ice formation as the closure member mounting plate is pivoted relative to the vehicle body mounting plate, wherein the icebreaker flange includes a first flange piece and a second flange piece in abutting engagement with the first flange piece.

11. A vehicle, comprising:
- a vehicle body;
- a closure member; and
- a hinge assembly for mounting the closure member to the vehicle body, wherein the hinge assembly includes a first mounting plate mounted to the vehicle body, a second mounting plate mounted to the closure member, and an icebreaker flange configured to break through an ice formation formed at an interface between the closure member and the vehicle body, wherein the icebreaker flange establishes a lowermost section of the hinge assembly and is bolted or screwed directly to the second mounting plate.

12. The vehicle as recited in claim 11, wherein the closure member is a swing gate.

13. The vehicle as recited in claim 11, wherein the icebreaker flange extends from the second mounting plate and includes a platform portion and blade portion.

14. The vehicle as recited in claim 11, wherein the icebreaker flange is a separate component from the first mounting plate and the second mounting plate.

15. The vehicle as recited in claim 11, wherein the icebreaker flange and the second mounting plate together establish a single piece, monolithic part.

16. The vehicle as recited in claim 11, wherein the icebreaker flange includes a first flange piece and a second flange piece received in abutting engagement with the first flange piece.

17. The vehicle as recited in claim 11, wherein the icebreaker flange includes a platform portion, a first blade portion, and a second, separate blade portion.

18. The vehicle as recited in claim 11, wherein the icebreaker flange includes a blade portion having a curved cutting edge.

* * * * *